Patented Feb. 8, 1944

2,340,996

UNITED STATES PATENT OFFICE

2,340,996

COATING COMPOSITION

William H. Smyers, Westfield, N. J., assignor to Standard Oil Development Company, a corporation of Delaware No Drawing. Application December 27, 1939, Serial No. 311,111

12 Claims. (Cl. 106—14)

This invention is on an organic composition for coating metal surfaces to retard their rusting, corroding, or tarnishing, and to maintain them in a clean condition.

It is known that metal surfaces become corroded by exposure to weather as well as various chemical agents such as oxidizing and acidic compounds, especially in the presence of moisture and acid fumes. For protection of such metal surfaces various coating compositions known as slushing oils have been proposed as corrosion deterrents.

Objects of this invention are: to improve corrosion prevention of metal surfaces; to provide a slushing oil which is easily applied to many kinds of metal surfaces by a variety of methods, such as brushing, spraying, dipping, etc.; and to provide a coating sufficiently impervious to exclude moisture and air or acidic compounds for a long period, and, yet, of such nature that it may be completely removed, when desired, without excessive work, leaving the metal surface in a clean condition.

According to the present invention, by dissolving onium compounds into hydrocarbon oils, compositions now have been obtained which are considered to meet the essential requirements of such coating compositions and to be additionally more useful than hitherto known compositions in other valuable qualities; and to attain this object, in its preferred embodiment, this invention has reference to an improved slushing oil composition which removes preformed rust or dirt from a metal article, especially fabricated metal sheets, bars, pipes, etc., as it is applied, has no staining or corrosive action on common metals, and leaves a thick, lasting, stable film which may be transparent and which is readily removed with inexpensive solvents, such as kerosene.

Broadly, the practice of this invention comprises homogeneously dispersing into a nonaqueous, water-insoluble liquid or liquefiable medium, such as a viscous petroleum oil, a minor amount of an onium base identified by the type formula:

$$R_nMX$$

wherein $R_n$ are selected hydrocarbon radicals (not being necessarily the same), M is a metalloid or metal onium base element, and X represents a negative inorganic group, such as a hydroxyl group or a mineral acid anion radical.

More specifically, the onium compounds selected for the present purposes should be mildly alkaline and highly oil-soluble so that they are not removed from the oil by moisture and can neutralize the coating composition. Compounds of this type serve to minimize development of acidity in the oil, aid the oil in wetting a metal surface, and have a detergent effect on rust or carbonaceous deposits adhering to the metal surface. The subscript $n$ represents an integer having a numerical value 1 less than the valence of M. In general, any of the elements in the right hand columns of the fourth, fifth, and sixth groups of the Mendeleeff Periodic Table are capable of forming such onium compounds, but nitrogen and phosphorus are preferred. Thus, the compounds used in the present invention are preferably quaternary compounds, and in most instances, instead of being the onium base hydroxides, are salts of weak acids, such as the bicarbonates.

Procedures by which the desired onium compounds are produced are well known. A classical method may be outlined as involving the following reactions:

(1) $R_3M + RX \rightarrow R_4MX$
(2) $R_4MX + OH^- \rightarrow R_4MOH + X^-$
(3) $R_4MOH + X^- \rightarrow R_4MX$ In these equations R represents, for example, like or unlike hydrocarbon radicals, X represents a negative radical, such as a halide, which is more strongly negative than $OH^-$, which in turn may be converted into a salt, e. g., bicarbonate, or be replaced by another negative radical, and M represents nitrogen or a similar onium base forming element.

Although complete oil-solubility is not an absolute requirement in all cases, it is a distinct preference for most efficient results, and in any case the onium compounds used should have at least substantial solubility in hydrocarbon oils. For best results, the onium compound used should contain at least 10 carbon atoms in aliphatic linkages.

Specific examples of these onium bases having sufficient solubility in hydrocarbon oils to make homogeneous slushing oil compositions with a mineral oil base are: dimethyl benzyl cetyl ammonium hydroxide, dimethyl octadecyl benzyl ammonium hydroxide, diethyl distearyl ammonium hydroxide, diethyl benzyl decyl ammonium hydroxide, diethyl dicetyl ammonium hydroxide, and trimethyl cetyl ammonium hydroxide. Mixtures of these various compounds are often preferred. For the sake of brevity, other analogous compounds are thus indicated to be satisfactory if they contain an aryl, naphthenic, alkaryl, or aralkyl radical, that is, a radical from the phenyl, cresyl, cycloamyl, or benzyl series together with alkyl radicals, which contain a total of at least 10 carbon atoms per molecule, also, when the nitrogen constituent is replaced by other onium forming elements as indicated. The alkyl radicals may be both lower and higher groups, meaning thereby that the alkyl radicals may comprise methyl series groups having both less and more than 10 carbon atoms, but in any

event, for more advantageous performance, they should include at least one higher alkyl radical containing more than 8 carbon atoms, for example, a radical such as decyl, dodecyl, cetyl, stearyl, etc.

These onium bases are not to be confused with oximes, nor with tertiary hydroxy amines, nor with other types of compounds having a hydroxy group united to carbon instead of nitrogen. An essential characteristic of the onium compounds is that the onium base element is joined to a hydroxy group or to a weak organic acid group such as carbonate, bicarbonate, etc., and all its other valences are satisfied by organic radicals.

In general, the slushing oil or coating composition to be applied to iron and steel articles for their protection from the action of the atmosphere and various weather conditions according to this invention, should consist essentially of a non-volatile petroleum oil, e. g., mineral seal oil, lubricating oil stocks, and the like, but preferably even higher boiling distillates or residual fractions, e. g., petrolatum, paraffin wax, cylinder stock, or even asphaltic or tarry fractions, or mixtures thereof, blended with a very small quantity of one of the onium bases soluble therein.

While even minute quantities of the onium bases dissolved in the oil, for example, in a proportion of the order of about 0.1%, have beneficial effects, larger proportions even up to 10% may be used depending somewhat on the temperatures, the acid-forming tendencies of the oil, and conditions under which the oil is to be used. In general, about 0.1% to 1% of the onium base is sufficient. The slushing oil may contain, also, a volatile diluent, e. g., petroleum naphtha, liquefied gaseous hydrocarbons such as butane, etc., to facilitate spreading of the oil, the diluent in evaporating later, leaving a protective film which remains in place.

When it is desirable to use a slushing oil which overcomes the very serious defect of slipping from bright metal surfaces, particularly those which are necessarily kept in vertical position, it is highly advantageous to incorporate into the slushing oil composition, a small percentage of polymers of isobutylene having a molecular weight above 1,000, preferably above 30,000 for increasing adhesiveness. In some instances, it may be desirable to use an ingredient such as paraffin wax, carnauba wax, high melting petrolatum wax, etc., or various other waxes or resins, which add hardness to the coating. It may also be used compounded with commonly adopted slushing compounds, such as, lanolin, wool fat, degras, etc. For example, 1 part of the onium compound may be mixed with 3 parts of neutral degras, and 1 to 3 parts of this product may be added to a petroleum vehicle, such as, naphtha, lubricating oil and/or petrolatum used in a proportion of from 2 to 25 parts.

While the major use of the disclosed slushing oils is for protecting machined and polished parts during storage, they may also be used during the service of these parts in assembled mechanisms. It is not only unnecessary to wipe the protective coating from engine bearings, cylinders, pistons, piston rings, etc., when they are assembled, but it is beneficial to let the coating remain on these parts even after the parts are assembled and the machine is set in operation, because the protective coating continues to function as a corrosion inhibitor.

Another advantageous use of the slushing oil having a cleansing action due to the onium compounds, is in swabbing rifle and gun barrels because such a slushing oil facilitates the removal of harmful deposits, loosening burnt powder residues while it forms the protective oil film which counteracts moisture and acids.

The manner in which the new and improved slushing oils function as cleaning agents is shown by laboratory experiments on used engine pistons. Used engine pistons coated with fast adhering carbonaceous deposits were immersed in onium base-oil solutions. After standing in contact with the solutions for periods ranging from a few minutes to a number of hours depending upon the temperature, the carbonaceous deposits were loosened and easily removed by a light brushing. The cleaned pistons with their retained coating of slushing oil were then protected from corrosion on storage for an indefinite period. On repeated inspection of the thus protected pistons over a period of several days, there was no detection of corrosion or discoloration of the metal surfaces.

Although the protective film of the onium compound slushing oils is persistent and efficacious in resisting corrosion of metal surfaces under atmospheric conditions, the solution performs its cleaning function more readily at elevated temperatures. The oil-soluble onium compounds are advantageous in this respect because they are relatively non-volatile and stable to heat. This fundamentally makes possible their use to coat metal surfaces maintained all or part of the time at an elevated temperature.

Tests were conducted by coating specimens of various metals, such as iron, steel, and various other alloys, with oil solutions of onium compounds described and with the untreated oil vehicle as a control. These coated specimens and similar uncoated specimens were exposed to accelerated drastic corroding conditions; observations being made of the amounts of rusting and staining, and the periods over which these actions were prevented.

Test procedure

Sand blasted panels of hot rolled steel (automobile body sheet steel) were dipped into the oil samples at room temperature, then kept vertically in a box at room temperature for 16 hours under ordinary room conditions. Next, the coated panels were put in upright position and spaced apart into humidifier chambers having a volume of 16 cu. ft. and supplied with humidified air at a rate of 12 cu. ft./hr. with a controlled temperature. In one test the temperature was maintained at 100° F., the humidity at 100%, and the panels were held vertically within the test chamber by racks. In another test, room temperature and a humidity of 95% were maintained within the chamber wherein the panels were vertical suspended. The time, in hours, that a panel was subjected in the humidifier to these controlled conditions until rust made its first appearance on the panel was observed and recorded as the resistance life of the coating composition.

Example

A paraffinic base petroleum pale oil having a viscosity of 100 Saybolt seconds at 100° F. was used as the vehicle, a blank sample of this vehicle and a sample of this vehicle containing 1.0% of benzyl dimethyl cetyl ammonium bicarbonate were tested in the humidifiers using the procedure which has been explained, by which the following data were obtained:

| Sample tested | Humidifier test (hours) | |
|---|---|---|
| | 100° F. 100% humidity | Room temp. 95% humidity |
| Blank | 2 | 24 |
| Blank+1% onium compound | 24 | 300+ |

The data given indicate that the onium compound has a very positive anti-rust action, which far surpasses the action of many hitherto tested agents.

In another exepriment samples of 0.1 and 1.0% concentrations of benzyl dimethyl cetyl ammonium bicarbonate in an S. A. E. 20 refined lubricating oil was used to coat polished nails. These coated nails were suspended together with other polished nails of the same nature left uncoated and coated only with the lubricating oil vehicle in an outdoor atmosphere containing a high concentration of refinery acid fumes. The oil free nails were found to be completely rusted after 5 days exposure. The nails coated with the untreated oil vehicle showed almost complete rusting after 12 days. The nails coated wtih the oil containing the onium compound after 12 days were partly corroded, mainly at the upper part from which the coating had flown down, being bright and shiny over the lower part.

The foregoing experiment illustrates how slushing oils provided herewith may be very useful in metal fabricating industries, as for example where slushing of metal pieces has to be carried out close to pickling operations.

Results have indicated that the oil-soluble onium compounds act as rust inhibitors with more beneficial results than can be obtained with coatings which essentially contain emulsions of water-soluble onium bases and oil. This is probably due to the fact that water-soluble onium bases which are present in the minute water globules of the emulsion do not sufficiently contact with the metal surface in order to form a protective film on the surface and tend to reverse the phases to an oil in water emulsion.

Another important effect gained by having the onium compound dissolved in the oil medium is that the homogeneously dispersed onium compound acts more effectively to retard acid formation within the oil, particularly with the onium compound containing the weak acid radical, namely, the bicarbonate radical.

It is not intended that the invention be limited to the specific examples given nor to any theory advanced as to the operation of the invention. Various palpable modifications of the compositions described and in their utilization come within the scope and spirit of the invention as defined in the appended claims.

In the appended claims, the term "onium base" is intended to include both the hydroxide and weak organic acid salts of onium bases.

I claim:

1. The method of preventing corrosion of metal surfaces in an atmosphere of high humidity, which comprises coating said surfaces with an organic composition consisting essentially of mineral oil hydrocarbons blended with a small proportion of an onium compound containing at least 10 carbon atoms per molecule in alkyl radicals and having substantial solubility and sufficient concentration in said hydrocarbons to prevent moisture and air from contacting with said metal surfaces.

2. A method as described in claim 1, in which said organic onium compound has the type formula:

$$R_nMX$$

wherein $R_n$ represents hydrocarbon radicals, $n$ in number, including alkyl groups that contain a total of at least 10 carbon atoms, M is a pentavalent element, and X represents a negative inorganic group attached directly to M.

3. A method as in claim 1, in which said organic onium compound is a quaternary ammonium compound containing at least 3 alkyl groups attached to nitrogen.

4. A slushing oil composition consisting essentially of a liquid to solid mineral oil base stock containing dissolved therein about 0.1% to 10% of quaternary organic onium compound containing at least 10 carbon atoms per molecule in alkyl radicals, said composition in the form of a coating on metal surfaces being persistently impervious to moisture and air.

5. A slushing oil persistently impervious to moisture comprising non-volatile petroleum hydrocarbon fraction blended with 0.1% to 10% of benzyl dimethyl cetyl ammonium bicarbonate.

6. A slushing oil composition adapted for cleaning and protecting metal surfaces consisting essentially of a substantially water-free hydrocarbon oil solution of a basic organic onium compound containing at least 10 carbon atoms per molecule in alkyl radicals and which remains miscible with said hydrocarbon oil in concentrations of between about 0.1% and 10% for inhibiting corrosion while said composition is exposed to highly humidified air.

7. A composition as described in claim 6, in which said basic organic onium compound is a trialkyl aryl ammonium bicarbonate in which at least one alkyl group contains more than 8 carbon atoms.

8. A slushing oil persistently impervious to moisture and air consisting essentially of a non-volatile hydrocarbon oil solution of from about 0.1% to about 10% of a sulfonium salt of a weak acid, said sulfonium salt containing at least 10 carbon atoms per molecule in alkyl radicals and remaining persistently dissolved in the oil while the oil is exposed to highly humidified air.

9. A slushing oil composition persistently impervious to moisture and air consisting essentially of a non-volatile mineral hydrocarbon oil containing in solution from about 0.1% to 10% of a quaternary organic phosphonium compound which has at least 10 carbon atoms per molecule in alkyl radicals.

10. A slushing oil consistently impervious to moisture, comprising a non-volatile petroleum hydrocarbon fraction containing dissolved therein about 0.1% to 10% of a basic organic onium compound containing at least 10 carbon atoms per molecule in alkyl radicals and having at least one alkyl group containing more than 8 carbon atoms.

11. A slushing oil according to claim 6, also comprising a substantial amount of a volatile hydrocarbon liquid diluent serving to facilitate the application of the slushing oil in the form of a thin protective film on the metal surface to be coated.

12. A slushing oil according to claim 6, also comprising a substantial amount of a wax as a hardening agent.

WILLIAM H. SMYERS.